March 31, 1970  D. H. DESTY ET AL  3,503,512
BARRIER FOR OIL SPILT ON WATER

Original Filed June 20, 1968  3 Sheets-Sheet 1

INVENTORS.
DENIS HENRY DESTY
LESLIE BRETHERICK

BY
MORGAN, FINNEGAN, DURHAM & PINE
ATTORNEYS

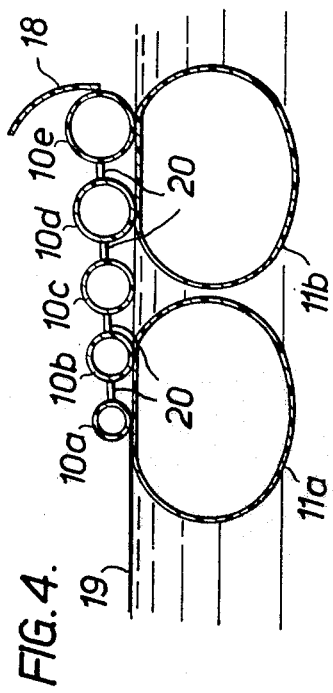
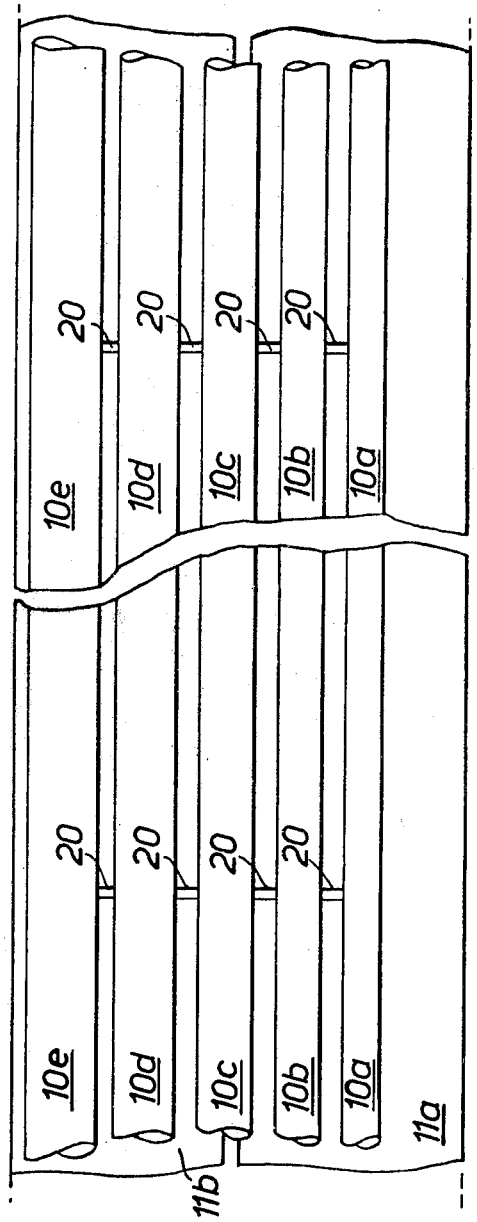

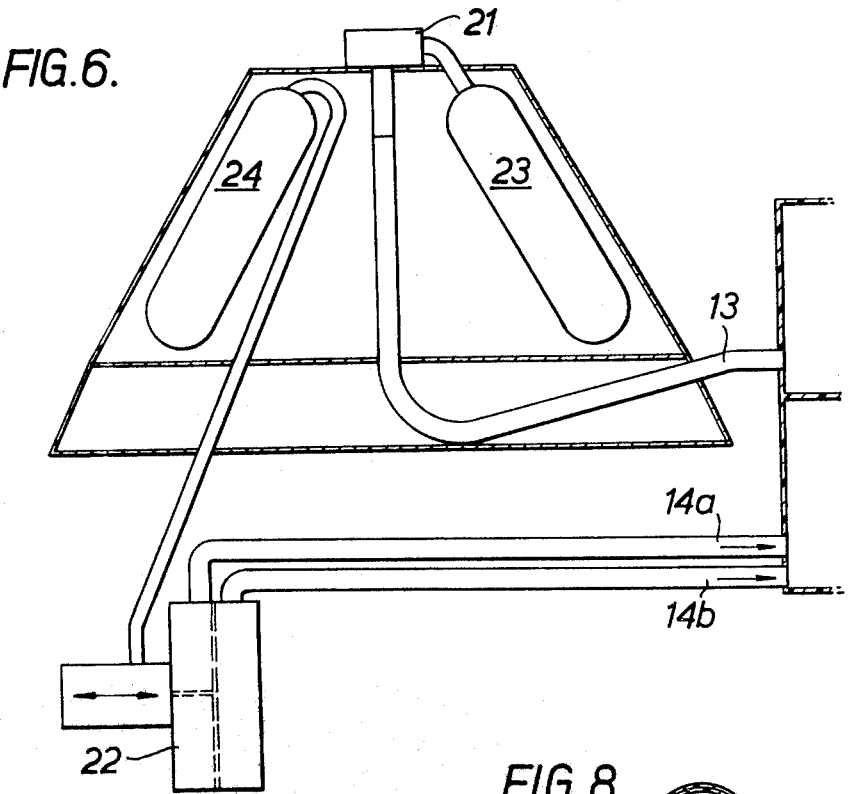
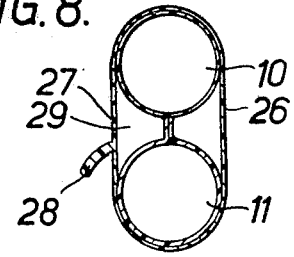
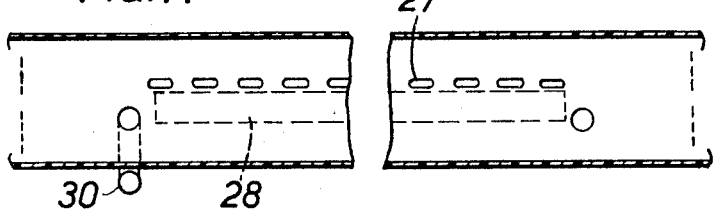

3,503,512
BARRIER FOR OIL SPILT ON WATER
Denis Henry Desty, Walton-on-Thames, Surrey, and Leslie Bretherick, Windsor, England, assignors to The British Petroleum Company Limited, London, England
Continuation of application Ser. No. 738,559, June 20, 1968. This application Oct. 14, 1969, Ser. No. 866,439
Claims priority, application Great Britain, June 22, 1967, 28,799/67
Int. Cl. B01d 17/02; E02b 15/04
U.S. Cl. 210—242
6 Claims

ABSTRACT OF THE DISCLOSURE

An inflatable barrier having water and air chambers which, when suitably inflated with air and water, floats with part below and part above the water surface to impede the passage of floating oil, e.g. a figure-of-eight cross-section which floats with its waist at the water level.

The barrier may also have a skimming chamber which connects to water level.

---

This application is a continuation application of application Ser. No. 738,559, filed June 20, 1968, now abandoned.

This invention relates to a barrier for oil spilt on water.

Of recent years the quantity of oil moved around the world has continually increased and this has resulted in the use of ever larger tank ships. As a consequence the chances of oil spillage have increased and particularly the chances of a very large oil spillage should one of the larger tank ships be wrecked. It is desirable to prevent these spillages spreading and this invention relates to a barrier which can float in the water and impede the passage of oil.

According to the invention an inflatable barrier for oil spilt on water comprises one or more air chambers and one or more water chambers all the walls of all said chambers being formed of flexible material, the chambers being so positioned that when the air chambers have been inflated with air and the water chambers have been inflated with water the barrier will float with part below and part above the water surface so as to impede the passage of floating oil.

Suitable flexible material includes (natural or synthetic) rubberised fabric, e.g. neoprene coated nylon.

Where the barrier comprises a plurality of air chambers it is preferred that all the air chambers interconnect so that the air inflation may be achieved from a single air inlet.

In this specification the verb "to inflate" is used to designate the admittance of both air and water, as appropriate, and in both cases it implies the right quantity to confer the desired mechanical properties on the inflated barrier. (During inflation a little water may be introduced into an air chamber or a little air into a water chamber. This "contamination" must be maintained at a sufficiently low level to avoid undesirable reduction in the efficacy of the barrier. If necessary this contamination could be reduced by incorporating suitable interconnections with non-return valves between the air and water chambers.)

After inflation with air and water the barrier has sufficient flexibility to follow wave motion although it is sufficiently resistant to twisting to enable it to maintain the water chambers below, and the air chambers above, the surface of the water.

We have found that the barrier behaves particularly well when the under-water portion has neutral buoyancy. It will be apparent that the mass of the flexible material from which the barrier is constructed will be small compared with the mass of the water contained in the barrier after inflation and therefore, for all practical purposes, the neutral buoyancy condition will be achieved provided that no massive elements, e.g. heavy metal chains, are incorporated in the structure.

In some applications the barrier may be subjected to stretching forces which act along the length of the barrier and these may be high enough to cause a risk of damage. In such applications one or more ropes, tapes or wires may be incorporated into the structure of the barrier so as to take the strain of these forces.

Conveniently each air chamber and each water compartment runs the whole length of the barrier. Such a barrier comprises a plurality of hoses longitudinally joined together so that when suitably inflated with air and water the barrier will float with part below and part above the surface of the water so as to impede the passage of floating oil.

According to a first preferred embodiment of the invention the barrier comprises twin hoses longitudinally joined together and having a figure-of-eight cross-section.

According to a second preferred embodiment of the invention (which incorporates more than two hoses longitudinally joined together) the barrier comprises a plurality of air hoses, e.g. 5–10, which are positioned side by side and at least one water hose attached to the air hoses, all the hoses being so positioned that when the barrier is inflated the air hoses form a raft and each water hose forms a ballast chamber so that the barrier floats with part below and part above the water surface so as to impede the passage of floating oil. (The water ballast also prevents the raft overturning.) Preferably the air hoses are graded in diameter so that, when inflated, the raft has a wedge shaped cross-section.

Where only one water hose is provided this should extend over a sufficient proportion of the width of the raft to prevent overturning. Where two water hoses are provided one should be situated adjacent to each edge of the raft.

The first preferred embodiment acts as a floating breakwater and it requires sufficient freeboard to reduce a splash-over of contamination to an acceptable amount.

The second preferred embodiment absorbs wave energy to reduce splash-over to an acceptable amount.

The invention also comprises barriers which have one or more skimming chambers which run lengthwise along the barrier and which have perforations which connect to water level when the barrier is inflated and floating. Pumping out the contents of a skimming chamber causes them to be replaced by material from the surface of the water and this enables oil floating on the water to be recovered.

It is important to prevent the skimming chambers collapsing when pumping reduces their internal pressure. This can be achieved by spring stiffeners (which become flat when the barrier is folded for storage) or, preferably, by support from the inflated chambers. In the case of a first preferred embodiment it is convenient to form the skimming chambers by a perforated membrane connected between the two hoses so that the membrane is stretched taut when the two hoses are inflated, e.g. a barrier in which the membrane takes the form of a tubular skin which contains a barrier according to the first preferred embodiment. (The perforations can be provided on one or both sides of the barrier.)

Flexible flaps made of a material having a density intermediate between that of oil and that of water may be fitted at the bottom of the perforations. These flaps find the oil/water interface and encourage preferential skimming of oil.

Since all the barriers according to the invention are constructed from flexible material they can be rolled up and packed into a relatively small space for transport and storage. Constructions which collapse to a flat configuration are particularly suitable for rolling up.

Air inflation is conveniently achieved by means of an air pump powered by compressed gas, e.g. air entrainment devices such as ejectors and Coando nozzles.

Similarly water inflation may be achieved by gas powered pumps, e.g. diaphragm pumps. Alternatively water inflation may be achieved by means of spring members which open each water chamber so that water enters via non-return inlets.

The invention includes the barriers when deflated for storage and when inflated for use. Air and the water upon which the barrier is to float are convenient for inflation since these are readily available. It is apparent that the air can be replaced by any other gas which is available at a suitable pressure.

The invention also includes two methods of making the first and second preferred embodiments specified above.

According to the first method different portions of the wall of a single hose are seamed together.

According to the second method two or more sheets of flexible material are joined together to produce the required configuration. This method is particularly convenient for making the second preferred embodiment since it is easier to make the cross linkages which are desirable to allow all the air tubes to be inflated from a single inlet.

(In the case of a barrier which comprises a plurality of air chambers and/or a plurality of water chambers the designer of the barrier will unusually intend that every chamber has a particular function, i.e. air or water chamber. However the barrier may still function even if one or more chambers are not inflated or if a water chamber is inflated with air or vice versa.)

The invention will now be described by way of example with reference to the drawings accompanying this specification in which.

Figure 3:
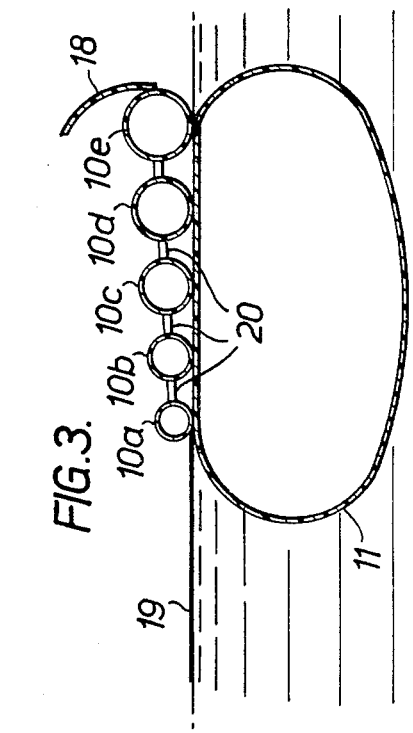

FIGURE 3 is a cross-section of a form of the second preferred embodiment having one water hose, FIGURE 4 is a cross-section of another form of the second preferred embodiment having two water hoses, FIGURE 5 is a plan of the barrier shown in FIGURE 4, FIGURE 6 is a diagrammatic cross-section of the air and water pumps, FIGURE 7 is a longitudinal cross-section of a barrier having a skimming chamber, and FIGURE 8 is a cross-section of FIGURE 7.

Figure 1:
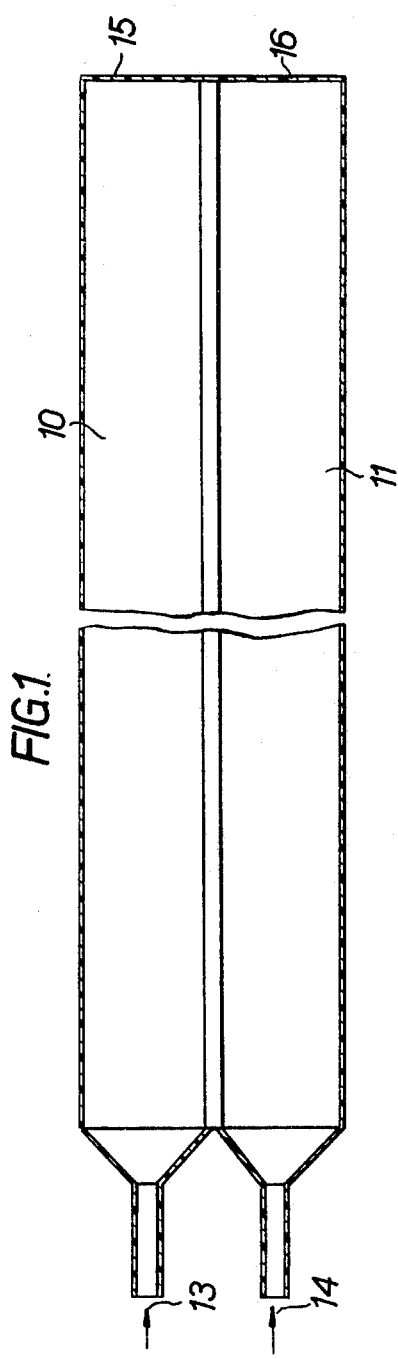
FIGURE 1 is a longitudinal cross-section of the first preferred embodiment.
Figure 2:
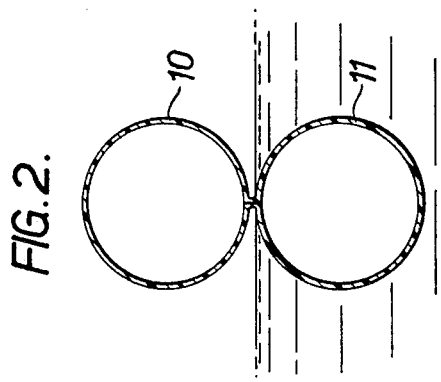
FIGURE 2 is a cross-section of FIGURE 1.

The barrier shown in FIGURES 1 and 2 was produced from a single hose which was seam welded down the centre to produce two hoses 10 and 11 which are of equal diameter; this form of the barrier can also be produced from two flat sheets of flexible material, e.g. neoprene coated nylon, by sticking them together along both sides and along the centre. The two hoses 10 and 11 are longitudinally joined together and they have a figure-of-eight cross section. Hose 10 has an air inlet 13 and is closed at the end 15. Similarly hose 11 has a water inlet 14 and is closed at the end 16. (Inlets may be provided at both ends if desired.)

Using a tube which collapses to a flat configuration means that the barrier will also collapse to a flat configuration so that it can be easily wound onto a drum for transport and storage. This ability of easy storage is important since, for example, barriers could be carried on oil tank ships so that they are more likely to be on site if a spillage occurs.

When it is required for use the barrier is unwound from its reel and the upper hose 10 filled with air via the air inlet 13 as the unwinding proceeds. The hose 11 is preferably retained in its collapsed position (by keeping the water inlet closed) until the barrier has been manoeuvred into its final position. At this stage the hose 11 can be filled with water. When both hoses have been inflated the barrier resists twisting but retains sufficient flexibility to follow the wave action.

When placed in water the barrier floats as indicated in FIGURE 2 with the water level up to the waist of the figure-of-eight. It is clear that this arrangement forms a vertical breakwater and forms a barrier which impedes the passage of floating oil.

The barrier shown in cross-section in FIGURE 3 comprises 6 hoses longitudinally joined together. These are 5 air hoses 10a–10e which are positioned side by side and graded in diameter (the hose 10a being the smallest and 10e the largest) and a single water hose.

In the inflated condition shown in FIGURE 3 the air hoses 10a–10e form a wedge shaped raft and the water hose 11 forms a ballast chamber extending under the whole of the raft.

The barrier shown in FIGURE 4 is similar to one shown in FIGURE 3 except that it has two water hoses, 11a and 11b, situated at opposite edges of the raft.

The top plan view of both FIGURES 3 and 4 is the same and it is shown in FIGURE 5. This figure shows that all the air hoses are inter-connected by means of cross-linkages 20 so that they can all be inflated from one inlet (not shown in FIGURES 3–5). The two water-hoses of FIGURE 4 are not inter-connected.

When placed in water a barrier according to the second preferred embodiment floats as indicated in FIGURES 3 and 4 with the oil slick 19 at the thin end of the wedge. The air hoses 10a–10e absorb the energy of the waves; any waves which manage to pass right across the air hoses are reflected by the curved back wall 18.

The barriers shown in FIGURES 3–5 can be made by applying adhesive in the appropriate pattern and sticking two sheets of flexible material, e.g. neoprene coated nylon, together to form the air hoses 10a–10e with the cross-linkages 20. The water hoses are similarly formed by sticking on one more sheet for FIGURE 3 and two more sheets for FIGURE 4. When uninflated this clearly gives a flat configuration which can be wound onto a drum.

FIGURE 6 shows, in diagrammatic form, a Coanda nozzle 21 for inflating the air hose(s) and a double acting diaphragm pump 22 for inflating the water hose(s).

The Coanda nozzle 21 (which is an air entrainment device described in British patent specification 869,065 and in an article published in "Scientific American" June 1966 at pp. 84–92) is powered by a high pressure air bottle 23 so that it obtains air from atmosphere and delivers it to the air inlet 13. The Coanda nozzle receives a small volume of air at high pressure and it delivers a large volume of air at low pressure.

The double acting diaphragm pump 22 is powered by a high pressure air bottle 24 and it obtains water in which the barrier is floating, e.g. the sea, and delivers it to the water hose(s). Since the pump has two outputs these can be combined to fill a single water hose (FIGURES 1–3) or separated to fill two water hoses (FIGURE 4). (The exhaust air from the water pump can be used for air inflation.)

The pump 21 and air bottles 23 and 24 are contained in a buoy (which is conveniently filled with a rigid plastic foam). The pump 22 is suspended below the buoy.

A modification which can be used to recover oil by skimming is illustrated in FIGURES 7 and 8. In this embodiment a perforated tubular skin 26 contains a barrier comprising hoses 10 and 11 as illustrated in FIGURES 1 and 2. When the two hoses are inflated the skin 26 forms a membrane which is stretched taut between them. The perforations 27 are situated at the level of the "waist" of the figure-of-eight so that they are at the water line when the barrier is afloat. A flexible flap 28 (of polythene or material of similar density and properties) is attached below the perforations 27.

This arrangement creates a skimming chamber 29 which runs the whole length of the barrier and which is maintained in the open position by the pressure in the hoses 10 and 11. When, during use, the contents of the skimming chamber 29 are removed by pumping at the outlet 30 (more than one such outlet may be provided if desired), the contents are replaced by fresh material which enters through the perforations 27. The fresh material may be air, oil, water or any mixture of these depending upon the position of the barrier due to wave action. However the flexible flap 28 has a density between that of crude oil and that of (sea) water and therefore it tends to remain at the oil/water interface. This encourages the preferential skimming of oil, i.e. of material from above the flap.

In use the barrier can be used to surround a patch of oil spilt on the water and remove the spillage at its periphery via the outlets. As the quantity of oil is reduced the length of the barrier can be shortened so that the oil is enclosed within a reduced area and consequently advantageously increased in thickness.

Alternatively the barrier illustrated in FIGURES 7 and 8 can be used to recover elongated narrow oil slicks by "trawling." In this case the barrier is attached to vessels which sail along the length of the oil slick with the oil slick between the two vessels. Towing causes the barrier to adopt a curved configuration and as the oil enters through the perforations 27 it tends to move to and accumulate at the apex of the curve. The oil can therefore be recovered by pumping from the vicinity of this point.

All the barriers described in this specification impede the passage of oil spillaves so that they can be prevented from spreading thereby facilitating their collection by other means so that they can be prevented from reaching uncontaminated locations, e.g. harbours and inlets. However the last described modification achieves more than this in that it plays an active part in the actual recovery and removal of the contamination.

We claim:

1. An inflatable barrier for oil spilt on water which comprises at least one inflatable air chamber and at least one inflatable water chamber joined to said air chamber along a jointure line, and the walls of all of said chambers being formed of flexible material, each such air chamber being inflated with air and each said water chamber being inflated with water, the chambers being so constructed and arranged that each said water inflated chamber will serve as a main ballast for the barrier, and the barrier will float with part below and part above the water surface and with the flotation level of said barrier being substantially along said jointure line of the air and water inflated chambers, so as to impede the passage of floating oil.

2. A barrier according to claim 1, in which the mass of the uninflated barrier is small compared with the mass of water contained in the barrier after inflation so that the under-water portion of the barrier has substantially neutral buoyancy.

3. A barrier according to claim 1, in which each water chamber and each air chamber runs the whole length of the barrier.

4. A barrier according to claim 3 which comprises a plurality of chambers longitudinally joined together so that the barrier will float with part below and part above the surface of the water so as to impede the passage of floating oil.

5. A barrier according to claim 4 which comprises two chambers longitudinally joined together and having a figure-of-eight cross-section.

6. A barrier according to claim 1 which also comprises one or more skimming chambers which run lengthwise along the barrier and which have perforations which connect to water level.

References Cited

UNITED STATES PATENTS

| 42,073 | 3/1864 | Cannon. |
| 1,004,718 | 10/1911 | Wieland. |
| 2,330,508 | 9/1943 | McColl. |
| 2,682,151 | 6/1954 | Simpson et al. |
| 3,221,884 | 12/1965 | Muller. |
| 3,369,664 | 2/1968 | Dahan. |

FOREIGN PATENTS

| 1,032,121 | 6/1958 | Germany. |
| 843,131 | 8/1960 | Great Britain. |

REUBEN FRIEDMAN, Primary Examiner

C. M. DITLOW III, Assistant Examiner

U.S. Cl. X.R.

61—1; 210—170

PO-1050
(5/69)

UNITED STATES PATENT OFFICE
CERTIFICATE OF CORRECTION

Patent No. 3,503,512      Dated March 31, 1970

Inventor(s) Denis Henry Desty and Leslie Bretherick

It is certified that error appears in the above-identified patent and that said Letters Patent are hereby corrected as shown below:

Column 3, line 6 "Coando" should read --Coanda--;
Column 3, line 31 "unusually" should read --usually--;
Column 4, line 20 "to one" should read --to the one--;
Column 5, line 32 "spillaves" should read --spillages--;
Column 5, line 34 "means so" should read --means or so--.

SIGNED AND
SEALED
AUG 18 1970

(SEAL)
Attest:

Edward M. Fletcher, Jr.
Attesting Officer

WILLIAM E. SCHUYLER, JR.
Commissioner of Patents